United States Patent
Shimizu (10) Patent No.: US 12,371,044 B2
(45) Date of Patent: Jul. 29, 2025

(54) CLEANING NOTIFICATION DEVICE, CLEANING NOTIFICATION METHOD, AND NON-TRANSITORY RECORDING MEDIUM IN WHICH CLEANING NOTIFICATION PROGRAM IS RECORDED

(71) Applicant: TOYOTA JIDOSHA KABUSHIKI KAISHA, Toyota (JP)

(72) Inventor: Ryusuke Shimizu, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 324 days.

(21) Appl. No.: 18/317,412

(22) Filed: May 15, 2023

(65) Prior Publication Data
US 2023/0382414 A1    Nov. 30, 2023

(30) Foreign Application Priority Data

May 26, 2022 (JP) .................. 2022-086359

(51) Int. Cl.
*B60W 50/14* (2020.01)
*B60S 1/56* (2006.01)
*G06V 20/56* (2022.01)

(52) U.S. Cl.
CPC ............ *B60W 50/14* (2013.01); *B60S 1/56* (2013.01); *G06V 20/56* (2022.01); *B60W 2050/143* (2013.01); *B60W 2050/146* (2013.01); *B60W 2420/403* (2013.01); *B60W 2540/225* (2020.02)

(58) Field of Classification Search
CPC .......... B60W 50/14; B60W 2540/225; B60W 2050/143; B60W 2050/146; B60W 2420/403; G06V 20/56; B60S 1/56
See application file for complete search history.

(56) References Cited

U.S. PATENT DOCUMENTS

| | | | | |
|---|---|---|---|---|
| 2012/0299733 A1* | 11/2012 | Knibbe | .................. | H05B 47/13 340/573.1 |
| 2015/0232030 A1* | 8/2015 | Bongwald | .......... | G02B 27/0101 348/115 |
| 2015/0260580 A1* | 9/2015 | Alameh | .................. | G01J 5/027 250/339.02 |
| 2019/0111941 A1* | 4/2019 | Hori | ....................... | G05D 1/021 |
| 2020/0406864 A1* | 12/2020 | Sakai | ....................... | B60S 1/481 |

(Continued)

FOREIGN PATENT DOCUMENTS

| JP | 2003-112591 A | 4/2003 |
|---|---|---|
| JP | 2010-128645 A | 6/2010 |

(Continued)

*Primary Examiner* — Steven Lim
*Assistant Examiner* — Son M Tang
(74) *Attorney, Agent, or Firm* — Oblon, McClelland, Maier & Neustadt, L.L.P.

(57) ABSTRACT

There is provided a cleaning notification device including: a detection unit which, in a case where cleaning of an imaging device that is installed on a vehicle and captures images of the environment external to the vehicle has been performed, detects the line of sight of a user riding in the vehicle; and a processing unit which, in a case where the user is looking at a first display device that displays captured images that have been captured by the imaging device, executes a process relating to an implementation notification indicating that cleaning of the imaging device has been implemented.

9 Claims, 4 Drawing Sheets

(56) References Cited

U.S. PATENT DOCUMENTS

| | | | |
|---|---|---|---|
| 2021/0009088 A1* | 1/2021 | Hayashi | B08B 3/02 |
| 2021/0039670 A1* | 2/2021 | Sakai | B60W 50/14 |
| 2021/0107040 A1* | 4/2021 | Violetta | B08B 3/041 |
| 2021/0229639 A1* | 7/2021 | Sato | B60S 1/56 |
| 2021/0350689 A1* | 11/2021 | Kelly | G08B 21/245 |
| 2022/0126791 A1* | 4/2022 | Shimizu | B08B 3/02 |
| 2022/0153235 A1* | 5/2022 | Sato | B60R 1/23 |
| 2022/0363194 A1* | 11/2022 | Windeler | H04N 7/181 |
| 2023/0182742 A1* | 6/2023 | Han | B60W 40/02 |
| | | | 701/23 |
| 2023/0278577 A1* | 9/2023 | Shimizu | B60S 1/56 |
| | | | 340/439 |
| 2023/0382414 A1* | 11/2023 | Shimizu | B60S 1/56 |
| 2024/0101070 A1* | 3/2024 | Inoue | B60S 1/52 |
| 2024/0135487 A1* | 4/2024 | Kristensen | G06T 3/4038 |
| 2024/0302649 A1* | 9/2024 | Koretz | G06V 10/764 |

FOREIGN PATENT DOCUMENTS

| | | |
|---|---|---|
| JP | 2019-162915 A | 9/2019 |
| JP | 2021-115929 A | 8/2021 |

\* cited by examiner

CLEANING NOTIFICATION DEVICE, CLEANING NOTIFICATION METHOD, AND NON-TRANSITORY RECORDING MEDIUM IN WHICH CLEANING NOTIFICATION PROGRAM IS RECORDED

CROSS-REFERENCE TO RELATED APPLICATION

This application is based on and claims priority under 35 USC 119 from Japanese Patent Application No. 2022-086359 filed on May 26, 2022, the disclosure of which is incorporated by reference herein.

TECHNICAL FIELD

The present disclosure relates to a cleaning notification device that notifies a user that an imaging device pertaining to an e-mirror has been cleaned, a cleaning notification method, and a non-transitory recording medium in which a cleaning notification program is recorded.

RELATED ART

Japanese Patent Application Laid-open (JP-A) No. 2021-115929 discloses a cleaning apparatus which, in a case where an automatic cleaning condition is met, executes a process to clean with a cleaning liquid an imaging device pertaining to an e-mirror installed on a vehicle.

In this connection, in order to enable the user to comprehend that cleaning of the imaging device has been implemented, there are occasions where the user is notified that cleaning has been implemented. However, if the display region for the notification is limited or the timing of the notification coincides with the timing of another notification, there is the concern that the user will not be able to comprehend that cleaning has been implemented even if the user is notified that cleaning has been implemented.

SUMMARY

It is an object of the present disclosure to provide a cleaning notification device which, in the case of notifying a user that cleaning of an imaging device has been implemented, allows the user to easily comprehend the notification, a cleaning notification method, and a non-transitory recording medium in which a cleaning notification program is recorded.

A cleaning notification device of a first aspect includes: a detection unit which, in a case where cleaning of an imaging device that is installed on a vehicle and captures images of the environment external to the vehicle has been performed, detects the line of sight of a user riding in the vehicle; and a processing unit which, in a case where the user is looking at a first display device that displays captured images that have been captured by the imaging device, executes a process relating to an implementation notification indicating that cleaning of the imaging device has been implemented.

The cleaning notification device of the first aspect detects the line of sight of the user riding in the vehicle in a case where cleaning of a lens of the imaging device pertaining to an e-mirror installed on the vehicle has been implemented and, in a case where the cleaning notification device has detected that the user is looking at the display device pertaining to the e-mirror, implements the process relating to the implementation notification. Namely, according to this cleaning notification device, the priority level of the implementation notification is raised in a case where the user is looking at the display device pertaining to the e-mirror. Because of this, in a case where cleaning of the imaging device has been implemented, the user can easily comprehend the notification.

A cleaning notification device of a second aspect is the cleaning notification device of the first aspect, wherein the processing unit raises a priority level of the implementation notification in a case where the user is not looking at the first display device and a predetermined condition is met.

According to the cleaning notification device of the second aspect, another notification can be prioritized and the user can be notified of the other notification.

A cleaning notification device of a third aspect is the cleaning notification device of the second aspect, wherein the predetermined condition is a case where the number of times the user has not been notified of the implementation notification has become equal to or greater than a threshold value.

According to the cleaning notification device of the third aspect, the user can be notified of the implementation notification even in a case where there is another notification.

A cleaning notification device of a fourth aspect is the cleaning notification device of the second aspect or the third aspect, wherein the processing unit sets the priority level of the implementation notification to an initial value in a case where the user has been notified of the implementation notification.

According to the cleaning notification device of the fourth aspect, even in a case where the priority level of the implementation notification has been raised, the user can be notified of the implementation notification and thereafter another notification can be prioritized and the user can be notified of the other notification.

A cleaning notification device of a fifth aspect is the cleaning notification device of the third aspect or the fourth aspect, wherein the processing unit counts the number of times the user has not been notified of the implementation notification in a case where there is another notification of which to notify the user on the same occasion as the implementation notification and the priority level of the other notification is higher than that of the implementation notification.

According to the cleaning notification device of the fifth aspect, notifications can be controlled by further clarifying a condition in which to not notify the user of the implementation notification.

A cleaning notification device of a sixth aspect is the cleaning notification device of the fifth aspect, wherein the processing unit notifies the user of the implementation notification in a case where the priority level of the implementation notification is higher than the priority level of the other notification or in a case where there is no other notification.

According to the cleaning notification device of the sixth aspect, notifications can be controlled by further clarifying a condition in which to notify the user of the implementation notification.

A cleaning notification device of a seventh aspect is the cleaning notification device of any one of the first aspect to the sixth aspect, wherein the processing unit notifies the user of the implementation notification by displaying the implementation notification on a second display device that displays that the cleaning has been performed.

According to the cleaning notification device of the seventh aspect, the user can be notified of the implementation notification without obstructing what is displayed on the display device pertaining to the e-mirror.

A cleaning notification method of an eighth aspect: detects, in a case where cleaning of an imaging device that is installed on a vehicle and captures images of the environment external to the vehicle has been performed, the line of sight of a user riding in the vehicle; and executes, in a case where the user is looking at a first display device that displays captured images that have been captured by the imaging device, a process relating to an implementation notification indicating that cleaning of the imaging device has been implemented.

The cleaning notification method of the eighth aspect detects the line of sight of the user riding in the vehicle in a case where cleaning of a lens of the imaging device pertaining to an e-mirror installed on the vehicle has been implemented and, in a case where the cleaning notification device has detected that the user is looking at the display device pertaining to the e-mirror, implements the process relating to the implementation notification. Namely, according to this cleaning notification method, the priority level of the implementation notification is raised in a case where the user is looking at the display device pertaining to the e-mirror. Because of this, in a case where cleaning of the imaging device has been implemented, the user can easily comprehend the notification.

A cleaning notification program recorded in a non-transitory recording medium of a ninth aspect causes a computer to execute a process to: detect, in a case where cleaning of an imaging device that is installed on a vehicle and captures images of the environment external to the vehicle has been performed, the line of sight of a user riding in the vehicle; and execute, in a case where the user is looking at a first display device that displays captured images that have been captured by the imaging device, a process relating to an implementation notification indicating that cleaning of the imaging device has been implemented.

The computer in which is executed the cleaning notification program recorded in the non-transitory recording medium of the ninth aspect detects the line of sight of the user riding in the vehicle in a case where cleaning of a lens of the imaging device pertaining to an e-mirror installed on the vehicle has been implemented and, in a case where the computer has detected that the user is looking at the display device pertaining to the e-mirror, implements the process relating to the implementation notification. Namely, according to this computer, the priority level of the implementation notification is raised in a case where the user is looking at the display device pertaining to the e-mirror. Because of this, in a case where cleaning of the imaging device has been implemented, the user can easily comprehend the notification.

According to the present disclosure, in the case of notifying the user that cleaning of the imaging device has been implemented, the user can easily comprehend the notification.

BRIEF DESCRIPTION OF THE DRAWINGS

An exemplary embodiment of the present disclosure will be described in detail based on the following figures, wherein.

DETAILED DESCRIPTION

The cleaning notification device of the present disclosure will now be described. The cleaning notification device notifies a user that cleaning of an imaging device pertaining to an e-mirror installed on a vehicle has been implemented (hereinafter called an "implementation notification").

(Vehicle)

Figure 1:
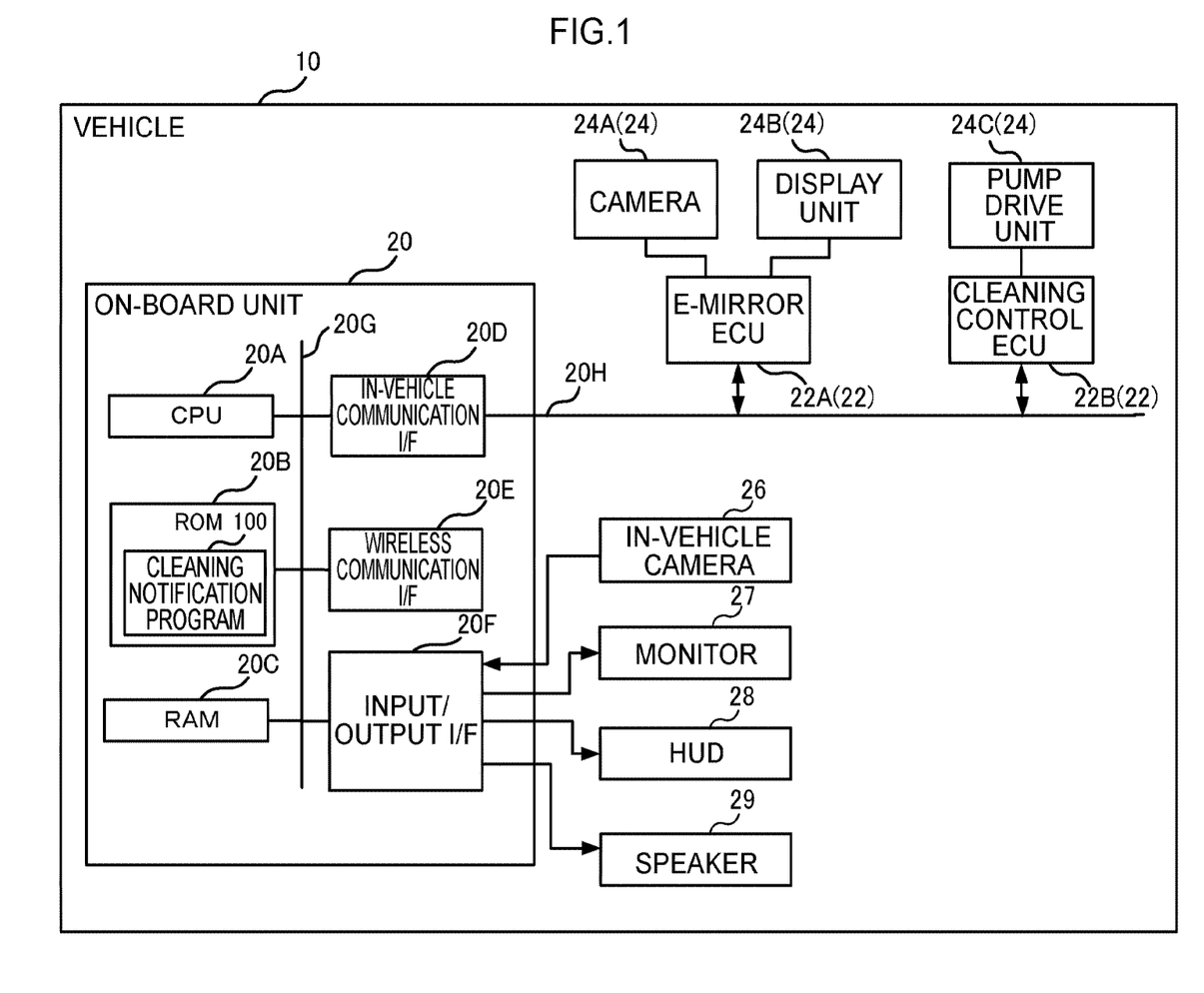
FIG. 1 is a block diagram showing hardware configurations of a vehicle of the embodiment.

As shown in FIG. 1, a vehicle 10 pertaining to this embodiment is configured to include an on-board unit 20, plural electronic control units (ECUs) 22, and plural on-board devices 24.

The on-board unit 20 is configured to include a central processing unit (CPU) 20A, a read-only memory (ROM) 20B, a random-access memory (RAM) 20C, an in-vehicle communication interface (I/F) 20D, a wireless communication interface (I/F) 20E, and an input/output interface (I/F) 20F. The CPU 20A, the ROM 20B, the RAM 20C, the in-vehicle communication interface 20D, the wireless communication interface 20E, and the input/output interface 20F are communicably connected to each other via an internal bus 20G.

The CPU 20A is a central processing unit, executes various types of programs, and controls each part of the on-board unit 20. That is, the CPU 20A reads programs from the ROM 20B and executes the programs using the RAM 20C as a workspace.

The ROM 20B stores various types of programs and various types of data. The ROM of this embodiment stores a cleaning notification program 100 that notifies the user of the implementation notification. In association with the execution of the cleaning notification program 100, the on-board unit 20 executes a process to detect implementation of the cleaning of the e-mirror and notify the user of the implementation notification. The RAM 20C temporarily stores programs or data as a workspace.

The in-vehicle communication interface 20D is an interface for connecting to the ECUs 22. The interface uses the CAN communication protocol. The in-vehicle communication interface 20D is connected to an external bus 20H.

The wireless communication interface 20E is a wireless communication module for communicating with external devices. The wireless communication module uses a communication protocol such as 5G; LTE, or Wi-Fi (registered trademark), for example. The wireless communication interface 20E is connected to a network N.

The input/output interface 20F is an interface for communicating with an in-vehicle camera 26, a monitor 27, a head-up display (HUD) 28, and a speaker 29 installed in the vehicle 10. It will be noted that the in-vehicle camera 26, the monitor 27, the HUD 28, and the speaker 29 may also be directly connected to the internal bus 20G It will be noted that the monitor 27 and the HUD 28 pertaining to this embodiment are an example of a "second display device."

The ECUs 22 include at least an e-mirror ECU 22A and a cleaning control ECU 22B.

The e-mirror ECU 22A has a camera 24A and a display unit 24B connected to it. The e-mirror ECU 22A performs control to display on the display unit 24B captured images that have been captured by the camera 24A. The e-mirror ECU 22A also performs control to cause the display unit 24B to display an icon representing the implementation notification in a case where the e-mirror ECU 22A has received an instruction from the on-board unit 20 to perform the implementation notification. It will be noted that the camera 24A pertaining to this embodiment is an example of an "imaging device" and the display unit 24B is an example of a "first display device."

The camera 24A is, for example, installed on right and left front side doors and a rear bumper of the vehicle 10. The camera 24A is configured by a left rear-view outer camera that captures images of the environment external to the vehicle 10 in the left rearward direction of the vehicle 10, a right rear-view outer camera that captures images of the environment external to the vehicle 10 in the right rearward direction of the vehicle 10, and a rear-view outer camera that captures images of the environment external to the vehicle 10 in the rearward direction of the vehicle 10. It will be noted that although in this embodiment a configuration is described where the camera 24A is a left rear-view outer camera, a right rear-view outer camera, and a rear-view outer camera, the camera 24A is not limited to this and may also be a camera that monitors the surrounding environment. For example, the camera 24A may be a back camera that is installed on the upper portion of a rear hatch door and whose optical axis direction is pointed more toward the ground than that of a rear-view outer camera, and the camera 24A may include a front camera that is installed on a front bumper and captures images of the environment in front of the vehicle 10.

The display unit 24B includes display devices corresponding to each of the left rear-view outer camera, the right rear-view outer camera, and the rear-view outer camera configuring the camera 24A. For example, the display device corresponding to the right rear-view outer camera is installed on the right end of the instrument panel, and the display device corresponding to the left rear-view outer camera is installed in the middle of the instrument panel. Furthermore, the display device corresponding to the rear-view outer camera is disposed in the front upper portion of the vehicle 10 in such a way that it faces the vehicle rearward direction. Furthermore, the display unit 24B displays an icon indicating that cleaning has been implemented in a case where the display unit 24B has received an instruction to perform the implementation notification. It will be noted that although a configuration is described where the display unit 24B pertaining to this embodiment displays captured images that have been captured by the camera 24A corresponding to each of the display devices, the display unit 24B is not limited to this. For example, the captured images captured by the left rear-view outer camera and the right rear-view outer camera may be displayed on the display device corresponding to the rear-view outer camera, and the captured images captured by the front camera and the back camera not shown in the drawings may be displayed on the display device corresponding to the rear-view outer camera.

The cleaning control ECU 22B has a pump drive unit 24C connected to it. In a case where the cleaning control ECU 22B detects dirt adhering to the camera 24A, it performs control to drive the pump drive unit 24C to clean the camera 24A pertaining to the e-mirror. The cleaning control ECU 22B sends to the on-board unit 20 a signal (hereinafter called an "implementation signal") representing the implementation notification in a case where the cleaning control ECU 22B has implemented the cleaning.

The pump drive unit 24C drives a pump in response to the instruction issued by the cleaning control ECU 22B, sprays a cleaning liquid on a lens portion of the camera 24A, and cleans the camera 24A.

The in-vehicle camera 26 is an imaging device that captures images of the user (driver) riding in the vehicle 10.

The monitor 27 is provided in the instrument panel or the dashboard of the vehicle 10, for example, and is a liquid crystal monitor for displaying various types of information.

The HUD 28 is provided in the instrument panel or the dashboard of the vehicle 10, for example, and is a display that displays various types of information on a small panel.

The speaker 29 is provided in the instrument panel, the center console, the front pillars, or the dashboard, for example, and is a device for outputting audio.

Figure 2:
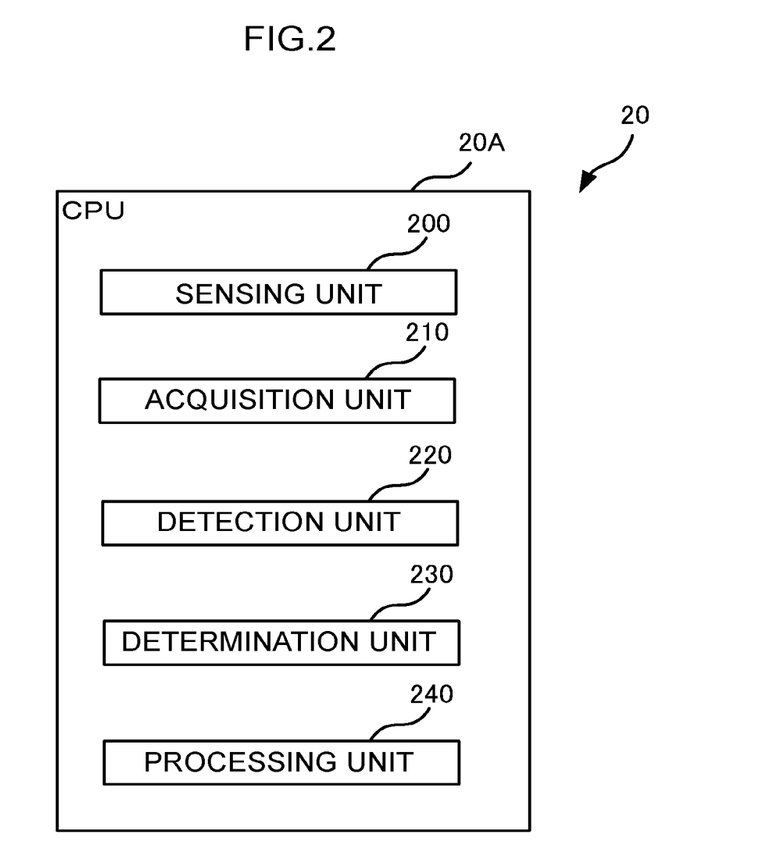
FIG. 2 is a block diagram showing functional configurations of an on-board unit of the embodiment.

As shown in FIG. 2, in the on-board unit 20 of this embodiment, the CPU 20A functions as a sensing unit 200, an acquisition unit 210, a detection unit 220, a determination unit 230, and a processing unit 240 by executing the cleaning notification program 100.

The sensing unit 200 senses that cleaning of the camera 24A pertaining to the e-mirror has been implemented. Specifically, the sensing unit 200 senses that cleaning has been implemented by sensing the implementation signal sent from the cleaning control ECU 22B.

The acquisition unit 210 acquires the captured images that have been captured by the in-vehicle camera 26 in a case where the sensing unit 200 has sensed the implementation signal.

The detection unit 220 detects, using the captured images that have been acquired by the acquisition unit 210, the line of sight of the user (driver).

The determination unit 230 determines, using the line of sight that has been detected by the detection unit 220, whether or not the user is looking at the display unit 24B. The determination unit 230 also determines whether or not the number of times the user has not been notified of the implementation notification (hereinafter called a "number of non-notifications") is equal to or greater than a threshold value. Here, the threshold value may be determined beforehand or may be set by the user.

The processing unit 240 performs a process to raise a priority level of the implementation notification in a case where the user is looking at the display unit 24B. For example, in a case where a priority level of "1" has been set for the implementation notification, the processing unit 240 sets "2," which indicates a higher priority level than the priority level that is currently set, in a case where the user is looking at the display unit 24B.

Furthermore, in a case where there is another notification different from the implementation notification on the same occasion in which to notify the user of the implementation notification, the processing unit 240 compares the priority level of the implementation notification with the priority level of the other notification and notifies the user of the notification with the higher priority level. Here, the processing unit 240 sends an instruction to display the implementation notification or the other notification to the e-mirror ECU 22A to thereby cause the display unit 24B to display the implementation notification or the other notification.

The processing unit 240 counts the number of non-notifications in a case where the user has not been notified of the implementation notification due to other notifications. The processing unit 240 performs a process to raise the priority level of the implementation notification in a case where the number of non-notifications is equal to or greater than the threshold value.

In a case where the priority level of the implementation notification is higher than that of the other notification or in a case where there is no other notification of which to notify the user on the same occasion, the processing unit 240 sends an instruction to display the implementation notification to thereby notify the user of the implementation notification. Here, the processing unit 240 initializes the priority level of the implementation notification and the number of non-notifications in a case where it has notified the user of the implementation notification.

(Control Flows)

Figure 3:
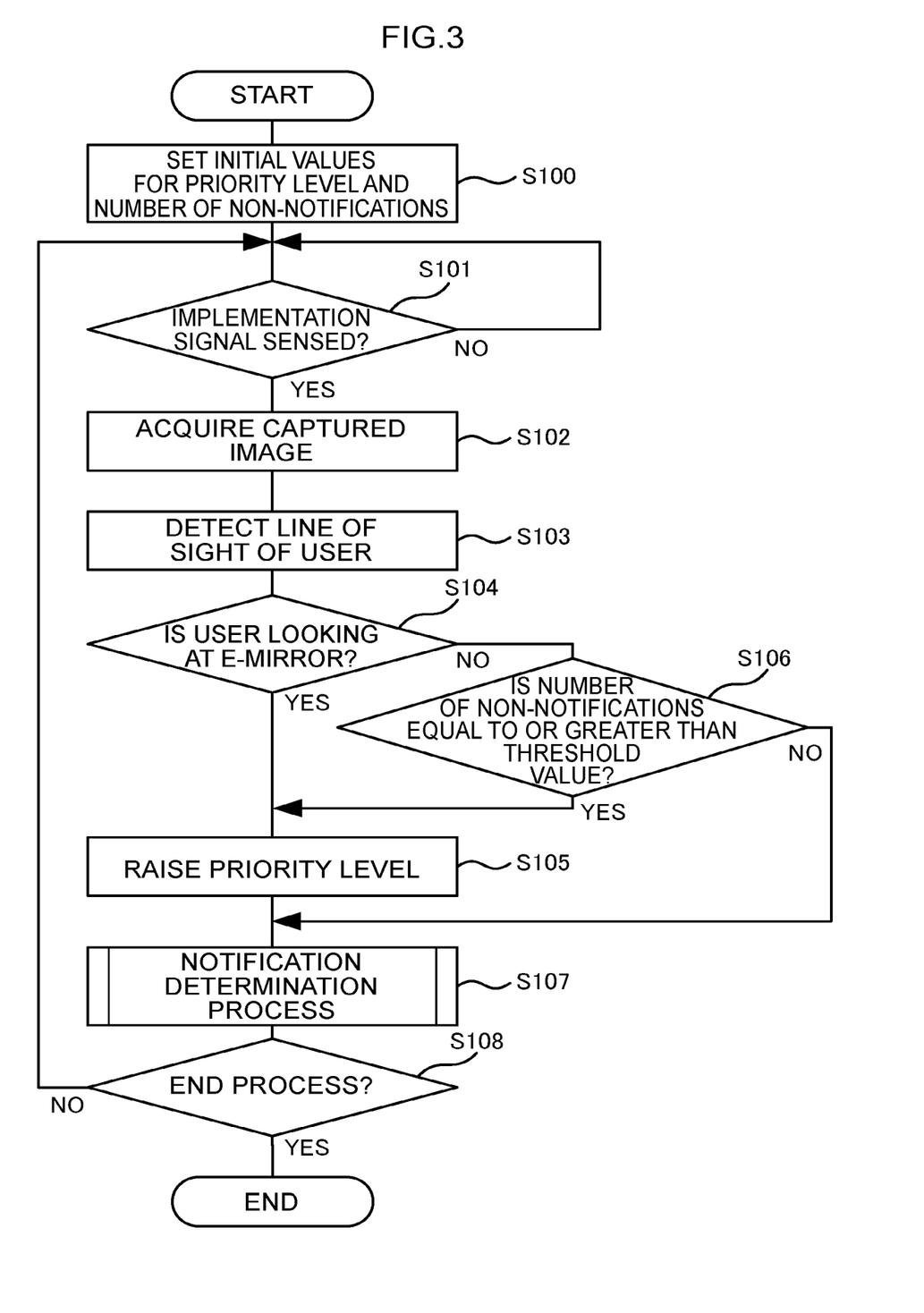
FIG. 3 is a flowchart showing the flow of a process to notify a user of an implementation notification executed in the on-board unit of the embodiment.
Figure 4:
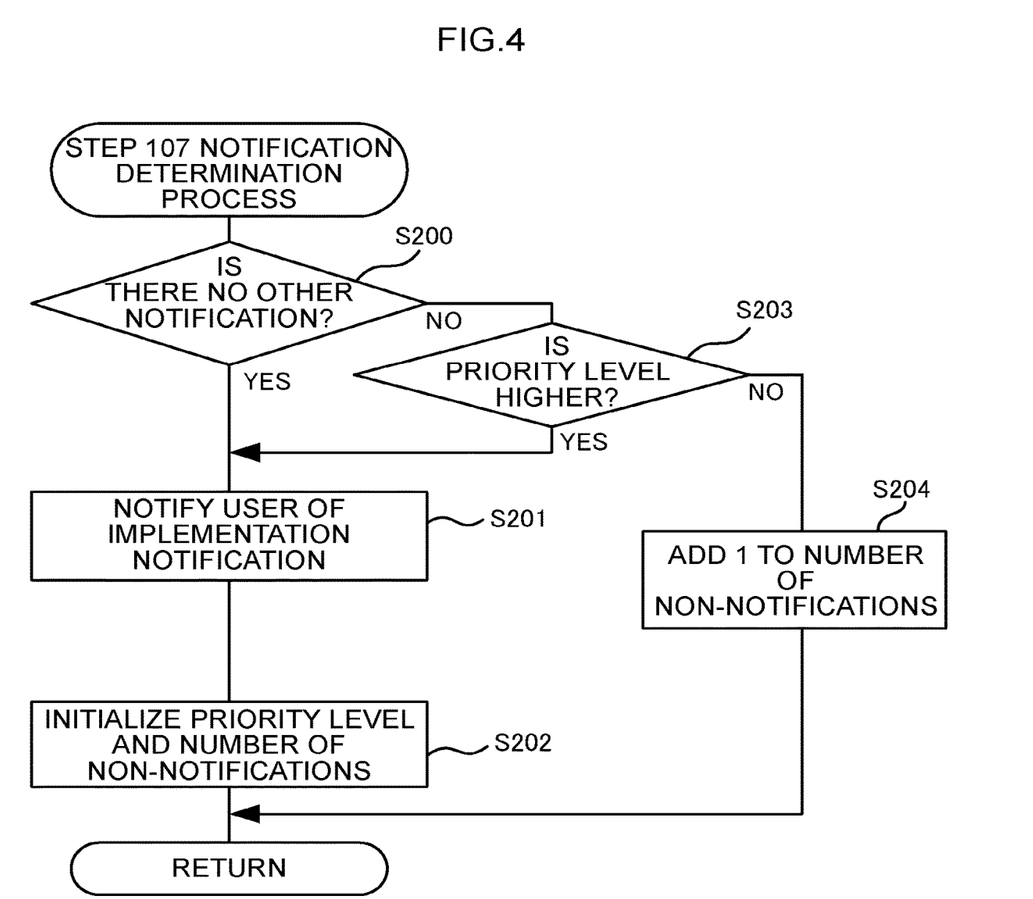
FIG. 4 is a flowchart showing the flow of a process to determine whether or not to notify the user of the implementation notification executed in the on-board unit of the embodiment.

Flows of processes executed by the cleaning notification device of this embodiment will now be described using the flowcharts of FIG. 3 and FIG. 4. The processes in the on-board unit 20 are executed as a result of the CPU 20A of the on-board unit 20 functioning as the sensing unit 200, the acquisition unit 210, the detection unit 220, the determination unit 230, and the processing unit 240. The process of notifying the user of the implementation notification shown in FIG. 3 is executed in a case where, for example, the engine of the vehicle 10 is driven and an instruction to notify the user of the implementation notification has been input.

In step S100 the CPU 20A sets initial values for the priority level of the implementation notification and the number of non-notifications. For example, the CPU 20A sets "1" for the priority level and sets "0" for the number of non-notifications.

In step S101 the CPU 20A determines whether or not it has sensed the implementation signal. In a case where the CPU 20A has sensed the implementation signal (step S101: YES), the CPU 20A moves to step S102. In a case where the CPU 20A has not sensed the implementation signal (step S101: NO), the CPU 20A stands by until it senses the implementation signal.

In step S102 the CPU 20A acquires the captured images that have been captured by the in-vehicle camera 26.

In step S103 the CPU 20A detects the line of sight of the user from the captured images it has acquired.

In step S104 the CPU 20A uses the line of sight of the user it has detected to determine whether or not the user is looking at the display unit 24B (e-mirror). In a case where the user is looking at the display unit 24B (step S104: YES), the CPU 20A moves to step S105. In a case where the user is not looking at the display unit 24B (step S104: NO), the CPU 20A moves to step S106.

In step S105 the CPU 20A performs a process to raise the priority level of the implementation notification.

In step S106 the CPU 20A performs a determination of whether or not the number of non-notifications is equal to or greater than the threshold value. In a case where the number of non-notifications is equal to or greater than the threshold value (step S106: YES), the CPU 20A moves to step S105. In a case where the number of non-notifications is not equal to or greater than the threshold value (in a case where the number of non-notifications is less than the threshold value) (step S106: NO), the CPU 20A moves to step S107.

In step S107 the CPU 20A performs a notification determination process. It will be noted that the notification determination process will be described in detail later with reference to FIG. 4.

In step S108 the CPU 20A performs a determination of whether or not to end the process to notify the user of the implementation notification. In the case of ending the process to notify the user of the implementation notification (step S108: YES), the CPU 20A ends the process to notify the user of the implementation notification. In the case of not ending the process to notify the user of the implementation notification (step S108: NO), the CPU 20A moves to step S101 and determines whether or not it has sensed the implementation signal.

Next, the notification determination process will be described with reference to FIG. 4. The notification determination process shown in FIG. 4 is executed in a case where, for example, an instruction to determine whether or not to notify the user has been input after the sensing unit 200 has sensed the implementation signal.

In step S200 the CPU 20A performs a determination of whether or not there is not another notification of which to notify the user on the same occasion as the implementation notification. In a case where there is not another notification (step S200: YES), the CPU 20A moves to step S201. In a case where there is another notification (step S200: NO), the CPU moves to step S203.

In step S201, the CPU 20A sends an instruction to display the implementation notification to the e-mirror ECU 22A to thereby notify the user of the implementation notification.

In step S202 the CPU 20A initializes the priority level and the number of non-notifications.

In step S203 the CPU 20A performs a determination of whether or not the priority level of the implementation notification is higher than the priority level of the other notification. In a case where the priority level of the implementation notification is higher (step S203: YES), the CPU 20A moves to step S201. In a case where the priority level of the implementation notification is not higher (in a case where the priority level of the implementation notification is lower than the priority level of the other notification) (step S203: NO), the CPU 20A moves to step S204.

In step S204 the CPU 20A adds 1 to the number of non-notifications.

(In Summary)

The on-board unit 20 serving as the cleaning notification device of this embodiment detects the line of sight of the user riding in the vehicle in a case where cleaning of the lens of the imaging device pertaining to the e-mirror installed on the vehicle has been implemented and, in a case where the on-board unit 20 has detected that the user is looking at the display device pertaining to the e-mirror, implements the process relating to the implementation notification. Namely, according to this cleaning notification device, the priority level of the implementation notification is raised in a case where the user is looking at the display device pertaining to the e-mirror. Because of this, in a case where cleaning of the imaging device has been implemented, the user can easily comprehend the notification.

According to this embodiment, in a case where cleaning of the imaging device has been implemented, the user can easily comprehend the notification.

REMARKS

It will be noted that although in the above embodiment a configuration was described where the cleaning notification device is installed in the on-board unit 20, the cleaning notification device is not limited to this and may be installed in an external device such as a center server. For example, the on-board unit 20 may send the implementation signal and the captured images in which the user is captured to the center server, receive a determination from the center server, and notify the user of the implementation notification in accordance with the determination.

Furthermore, in the above embodiment, a configuration was described where the implementation notification is displayed on the display unit 24B pertaining to the e-mirror.

However, the implementation notification is not limited to this. The implementation notification may be displayed on the monitor 27 and the HUD 28, and the user may be notified of the implementation notification by audio using the speaker 29. Furthermore, the means of using the captured images to determine the state of the user and notifying the user of the implementation notification in accordance with the state of the user may also be changed. For example, the implementation notification may be displayed on the display unit 24B in a case where the user is looking at the display unit 24B and may be displayed on the monitor 27 and the HUD 28 in a case where the user is not looking at the display unit 24B. Furthermore, the user may be notified of the implementation notification by the speaker 29 in a case where the user is not driving the vehicle 10 due, for example, to an autonomous driving mode.

Furthermore, in the above embodiment, a configuration was described where the on-board unit 20 performs the notification determination process. However, the notification determination process is not limited to this. The e-mirror ECU 22A may also perform the notification determination process. For example, the on-board unit 20 may send an instruction pertaining to the implementation notification and the priority level of the notification to the e-mirror ECU 22A, and the e-mirror ECU 22A may receive the instruction and the priority level and determine whether or not to notify the user in accordance with the priority level. In a case where the e-mirror ECU 22A did not notify the user of the implementation notification, the e-mirror ECU 22A may send to the on-board unit 20 a signal indicating that it did not notify the user, and the on-board unit 20 may count the number of non-notifications in a case where it has received the signal.

It will be noted that the processes that the CPU 20A executed by reading software (programs) in the above embodiment may also be executed by various types of processors other than a CPU. Examples of processors in this case include programmable logic devices (PLDs) whose circuit configuration can be changed after manufacture, such as field-programmable gate arrays (FPGAs), and dedicated electrical circuits that are processors having a circuit configuration dedicatedly designed for executing specific processes, such as application-specific integrated circuits (ASICs). Furthermore, the processes described above may be executed by one of these various types of processors or may be executed by a combination of two or more processors of the same type or different types (e.g., plural FPGAs, and a combination of a CPU and an FPGA, etc.). Furthermore, the hardware structures of these various types of processors are more specifically electrical circuits in which circuit elements such as semiconductor elements are combined.

Furthermore, in the above embodiment, the programs were described as being stored (installed) beforehand in a computer-readable non-transitory recording medium. For example, the cleaning notification program 100 in the on-board unit 20 is stored beforehand in the ROM 20B. However, the programs are not limited to this and may also be provided in a form in which they are recorded in a non-transitory recording medium such as a compact disc read-only memory (CD-ROM), a digital versatile disc read-only memory (DVD-ROM), and a universal serial bus (USB) memory. Furthermore, the programs may also take a form in which they are downloaded via a network from an external device.

The process flows described in the above embodiment are also examples, and unnecessary steps may be deleted, new steps may be added, and process orders may be changed in a range that does not depart from the spirit of the disclosure.

What is claimed is:

1. A cleaning notification device comprising:
    at least one processor that is configured to:
    in a case where cleaning of an imaging device that is installed on a vehicle and captures images of the environment external to the vehicle has been performed, detect the line of sight of a user riding in the vehicle;
    in a case where the user is looking at a first display device that displays captured images that have been captured by the imaging device, execute a process relating to an implementation notification indicating that cleaning of the imaging device has been implemented; and
    wherein the at least one processor raises a priority level of the implementation notification in a case where the user is not looking at the first display device and a predetermined condition is met.

2. The cleaning notification device of claim 1, wherein the predetermined condition is a case where the number of times the user has not been notified of the implementation notification has become equal to or greater than a threshold value.

3. The cleaning notification device of claim 2, wherein the at least one processor sets the priority level of the implementation notification to an initial value in a case where the user has been notified of the implementation notification.

4. The cleaning notification device of claim 2, wherein the at least one processor counts the number of times the user has not been notified of the implementation notification in a case where there is another notification of which to notify the user on the same occasion as the implementation notification and the priority level of the other notification is higher than that of the implementation notification.

5. The cleaning notification device of claim 4, wherein the at least one processor notifies the user of the implementation notification in a case where the priority level of the implementation notification is higher than the priority level of the other notification or in a case where there is no other notification.

6. The cleaning notification device of claim 1, wherein the at least one processor notifies the user of the implementation notification by displaying the implementation notification on a second display device that displays that the cleaning has been performed.

7. The cleaning notification device of claim 6, wherein the at least one processor further notifies the user of the implementation notification by audio.

8. A cleaning notification method by which a computer executes a process to:
    detect, in a case where cleaning of an imaging device that is installed on a vehicle and captures images of the environment external to the vehicle has been performed, the line of sight of a user riding in the vehicle;
    execute, in a case where the user is looking at a first display device that displays captured images that have been captured by the imaging device, a process relating to an implementation notification indicating that cleaning of the imaging device has been implemented; and
    wherein the process raises a priority level of the implementation notification in a case where the user is not looking at the first display device and a predetermined condition is met.

9. A non-transitory recording medium in which is recorded a cleaning notification program causing a computer to execute a process to:

detect, in a case where cleaning of an imaging device that is installed on a vehicle and captures images of the environment external to the vehicle has been performed, the line of sight of a user riding in the vehicle;

execute, in a case where the user is looking at a first display device that displays captured images that have been captured by the imaging device, a process relating to an implementation notification indicating that cleaning of the imaging device has been implemented; and wherein the process raises a priority level of the implementation notification in a case where the user is not looking at the first display device and a predetermined condition is met.

\* \* \* \* \*